US012186250B2

United States Patent
Iimura et al.

(10) Patent No.: US 12,186,250 B2
(45) Date of Patent: Jan. 7, 2025

(54) MOVABLE BODY CONTROL SYSTEM

(71) Applicant: HONDA MOTOR CO., LTD., Tokyo (JP)

(72) Inventors: Taiki Iimura, Wako (JP); Takayuki Nakagawara, Tokyo (JP); Takeshi Echizenya, Wako (JP); Tomokazu Sakamoto, Wako (JP); Etsuko Takasugi, Tokyo (JP); Shinichiro Kobashi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 806 days.

(21) Appl. No.: 17/331,676

(22) Filed: May 27, 2021

(65) Prior Publication Data
US 2021/0369521 A1    Dec. 2, 2021

(30) Foreign Application Priority Data
Jun. 1, 2020   (JP) ................................. 2020-095309

(51) Int. Cl.
    *A61G 7/053*      (2006.01)
    *A61G 5/04*      (2013.01)
    (Continued)

(52) U.S. Cl.
    CPC ............... *A61G 7/053* (2013.01); *A61G 5/04* (2013.01); *A61G 5/104* (2013.01); *G05D 1/021* (2013.01)

(58) Field of Classification Search
    CPC .......... A61G 7/053; A61G 5/04; A61G 5/104; G05D 1/021
See application file for complete search history.

(56) References Cited

U.S. PATENT DOCUMENTS

| 5,134,737 A | 8/1992 | Wyman |
| 8,676,420 B2 * | 3/2014 | Kume .................... B60L 15/20 701/22 |

(Continued)

FOREIGN PATENT DOCUMENTS

| CN | 109223356 | 1/2019 |
| JP | 2000-105884 | 4/2000 |

(Continued)

OTHER PUBLICATIONS

Japanese Office Action for Japanese Patent Application No. 2020-095309 mailed Aug. 1, 2023.

*Primary Examiner* — Tony H Winner
*Assistant Examiner* — Michael R Stabley
(74) *Attorney, Agent, or Firm* — Amin, Turocy & Watson, LLP

(57) ABSTRACT

A movable body control system includes: a movable body on which a user is capable of riding; a support device that supports a body of the user in a lying posture; a body detection device that detects a state of the user supported by the support device; a periphery monitor device that monitors a periphery of the support device; and a determination part that determines whether or not the movable body is capable of approaching the support device based on a detection result of the periphery monitor device. In the movable body control system, in a case where the body detection device detects that the user is in a predetermined state and the determination part determines that the movable body is capable of approaching the support device, the movable body approaches the support device.

11 Claims, 8 Drawing Sheets

(51) Int. Cl.
*A61G 5/10* (2006.01)
*G05D 1/00* (2006.01)

(56) References Cited

U.S. PATENT DOCUMENTS

| | | | |
|---|---|---|---|
| 9,375,376 B2 * | 6/2016 | Latney | A61G 7/16 |
| 11,129,762 B2 * | 9/2021 | Latney | A61G 7/053 |
| 2012/0095633 A1 | 4/2012 | Kume et al. | |

FOREIGN PATENT DOCUMENTS

| | | |
|---|---|---|
| JP | 2011-098617 | 5/2011 |
| JP | 2011-134158 | 7/2011 |
| JP | 2012-106722 | 6/2012 |
| JP | 2014-230560 | 12/2014 |
| JP | 2017-012426 | 1/2017 |
| JP | 2017-158800 | 9/2017 |

* cited by examiner

MOVABLE BODY CONTROL SYSTEM

CROSS-REFERENCE TO RELATED APPLICATION

Priority is claimed on Japanese Patent Application No. 2020-095309, filed on Jun. 1, 2020, the contents of which are incorporated herein by reference.

BACKGROUND

Field of the Invention

The present invention relates to a movable body control system.

Background

In the related art, in order for a patient lying in a bed to move to another location in a medical facility, particularly in a case where it is difficult for the patient to walk on his/her own, it is necessary for the patient to transfer to a movable body such as a wheelchair that is located beside the bed. However, in a case where the movable body is not in the vicinity of the bed, the patient himself/herself or another person needs to move the movable body close to the bed. Further, when the patient moves from the bed to the movable body on his/her own, a motion in which the body weight is supported by the upper body occurs, and therefore, assistance by another person is required in a case where the physical strength of the patient is insufficient.

For example, Japanese Unexamined Patent Application, First Publication No. 2000-105884 discloses a presence-in-bed detection device that determines and monitors presence-in-bed and absence-in-bed situations of a patient, a presence-in-bed position on a bedding of the patient, and the like on the basis of a change in a load of the bedding. However, it is not possible to reduce the workload of another person by only monitoring the patient. Japanese Unexamined Patent Application, First Publication No. 2011-134158 discloses a movement aid system that includes: a movable body on which a patient can ride, which can perform autonomous control, and which can be remotely controlled by an external system connected via a communication means; an operational unit that receives an input operation when a patient calls for a movable body; and a movement control means that controls the movable body to move to the patient. However, simply moving the movable body to the patient requires the patient to call the movable body after determining whether or not there is space for the movable body to approach the vicinity of the patient, and a burden occurs on the patient. In a case where the movable body is caused to wait at a position away from the patient, the assistance of another person is required when the patient transfers to the movable body.

SUMMARY

An aspect of the present invention provides a movable body control system that interlocks a support device such as a bed with a movable body and that supports a user of the support device to ride the movable body.

A movable body control system according to a first aspect of the present invention includes: a movable body on which a user is capable of riding; a support device that supports a body of the user in a lying posture; a body detection device that detects a state of the user supported by the support device; a periphery monitor device that monitors a periphery of the support device; and a determination part that determines whether or not the movable body is capable of approaching the support device based on a detection result of the periphery monitor device, wherein in a case where the body detection device detects that the user is in a predetermined state and the determination part determines that the movable body is capable of approaching the support device, the movable body approaches the support device.

According to the first aspect of the present invention, since the movable body approaches the support device when the user is in a predetermined state on the support device and the movable body is capable of approaching the support device, it is possible to move the movable body close to the support device without requiring the assistance of another person. Further, since a determination as to whether or not there is space in the vicinity of the support device by the user becomes unnecessary, it is possible to reduce the burden of the user. Accordingly, it is possible to provide a movable body control system that supports the user of the support device to ride the movable body.

A second aspect of the present invention is the movable body control system according to the first aspect described above, wherein the movable body may include: a seat part on which the user is seated; a lifting mechanism that raises and lowers the seat part; and a movable body control part that controls the lifting mechanism, wherein the movable body control part may control the lifting mechanism such that a height of a seating surface of the seat part is aligned with a height of a support surface that supports the user in the support device in a state where the movable body approaches the support device and stops.

According to the second aspect of the present invention, it becomes possible for the user seated on the support device to easily transfer to the seat part of the movable body.

A third aspect of the present invention is the movable body control system according to the second aspect described above, wherein the support device may be deformed such that a portion of an edge part is recessed to be capable of receiving the seat part in plan view.

According to the third aspect of the present invention, since a recess part which the seat part enters is formed at the edge part of the support device, the user can be seated on the seat part of the movable body by moving along the edge part of the support device. Therefore, the user can move in a state where a support surface of the support device is present behind the user. Accordingly, it is possible to easily ride the movable body in a stable posture compared to a case where the user moves in a direction away from the support device and transfers to a movable body that is located beside the support device.

A fourth aspect of the present invention is the movable body control system according to the first aspect described above, wherein the support device includes a removable part which includes a support surface that supports the user and which is formed to be removable, and the removable part may be supported by the movable body.

According to the fourth aspect of the present invention, it is possible to use part of the support device as a seat of the movable body on which the user is seated.

A fifth aspect of the present invention is the movable body control system according to any one of the first to fourth aspects described above, further including an operation part that receives an operation of the user, wherein the movable body may approach the support device in a case where the operation part is operated.

According to the fifth aspect of the present invention, it is possible to cause the movable body to approach the support device after confirming the user's desire to use the movable body. Therefore, it is possible to realize efficient assignment of the movable body.

According to an aspect of the present invention, it is possible to provide a movable body control system that interlocks the support device such as a bed with the movable body and that supports the user of the support device to ride the movable body.

DESCRIPTION OF EMBODIMENTS

Hereinafter, embodiments of the present invention will be described with reference to the drawings. In the following description, the same symbol is added to configurations having the same or similar functions. Redundant descriptions of the configurations may be omitted.

First Embodiment

Figure 1:
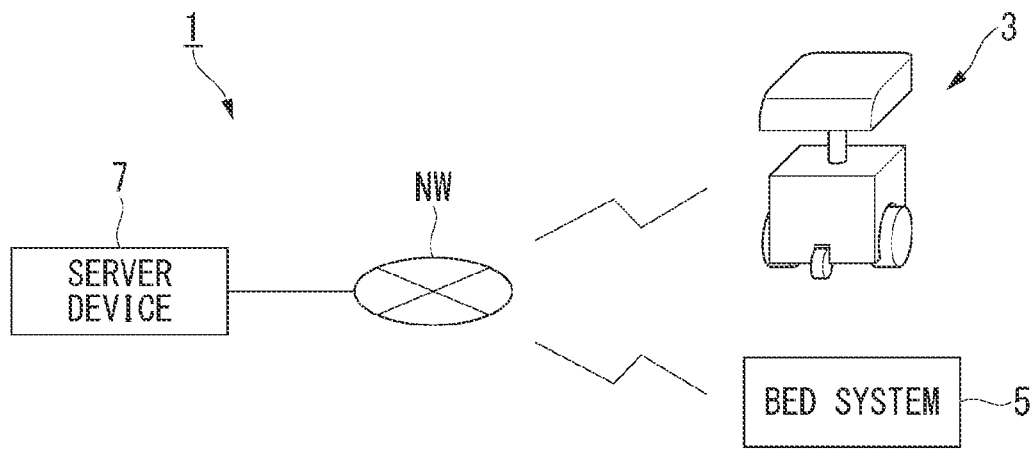
FIG. 1 is a view showing a configuration example of a movable body control system according to a first embodiment.

FIG. 1 is a view showing a configuration example of a movable body control system according to a first embodiment.

As shown in FIG. 1, a movable body control system 1 of the present embodiment is a system that supports the movement of a patient (user) in a medical facility such as a hospital in which a plurality of beds are provided. The movable body control system 1 includes a plurality of movable bodies 3, a plurality of bed systems 5, and a server device 7. The plurality of movable bodies 3, the plurality of bed systems 5, and the server device 7 communicate with one another via a network NW. The network NW includes the Internet, a WAN (Wide Area Network), a LAN (Local Area Network), a public line, a provider device, a dedicated line, a wireless base station, and the like.

Figure 2:
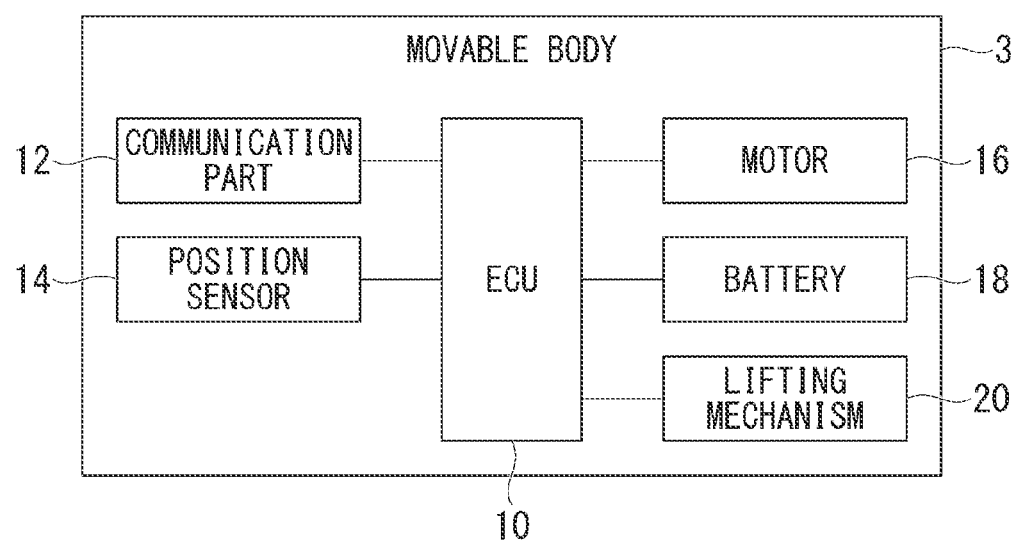
FIG. 2 is a view showing a functional configuration example of a movable body according to the first embodiment.

FIG. 2 is a view showing a functional configuration example of a movable body according to the first embodiment.

As shown in FIG. 2, the movable body 3 includes an ECU (Electronic Control Unit) 10, a communication part 12, a position sensor 14, a motor 16, a battery 18, and a lifting mechanism 20. The movable body 3 is remotely controlled by a server device 7. One patient is capable of riding the movable body 3, and the movable body 3 travels on the basis of a command of the riding patient.

The ECU 10 (movable body control part) controls the operation of components of the movable body 3. The ECU 10 generates a transmission signal in response to a detection result of the position sensor 14 and transmits the transmission signal to the server device 7 via the communication part 12. The ECU 10 performs autonomous control of the movable body 3. Specifically, the ECU 10 may generate a travel plan of setting a target point, a travel route, and the like of the movable body 3 or may control the operation of the movable body 3 based on the travel plan.

The communication part 12 is, for example, a wireless communication module for connecting to a network NW or communicating directly with another terminal device or the like. The communication part 12 performs wireless communication on the basis of Wi-Fi, DSRC (Dedicated Short-Range Communications), Bluetooth (Registered Trademark), or other communication standards. The communication part 12 performs data communication with the server device 7 in response to the control of the ECU 10.

The position sensor 14 is a sensor that measures position information of the position sensor 14. The position sensor 14 may include, for example, a sensor of a GNSS (Global Navigation Satellite System). A sensor of a GPS (Global Positioning System) may be applied to the position sensor 14 as a specific example of the sensor of the GNSS. The position sensor 14 may be a combination of the GNSS with a wheel encoder or an IMU (Inertia Measurement Unit), it is possible to measure position information that is continuous in a time series, and accordingly, it is possible to realize detailed autonomous movement.

Additionally, an external sensor such as a camera or a LIDAR (Light Detection and Ranging) may be applied, and by associating brightness information and the shape of the surrounding environment detected by the external sensor with map information stored in advance, it is possible to measure the position information even in an environment in which the sky is shielded or an indoor environment in which a GNSS positioning signal cannot be received. The map information is generated, for example, by applying SLAM (Simultaneous Localization and Mapping) to time-series information detected by the external sensor. Another aspect of the map information may be, for example, CAD (Computer-Aided Design) data of the room layout or the structure of a building in a case of movement in a facility. The position sensor 14 outputs the measurement result to the ECU 10.

The motor 16 generates a travel drive force of the movable body 3 in response to the control of the ECU 10. The battery 18 supplies electric power to the motor 16, the lifting mechanism 20, and the like. The lifting mechanism 20 raises and lowers the seat part 26 described later. The structure of the movable body 3 will be described later.

Figure 3:
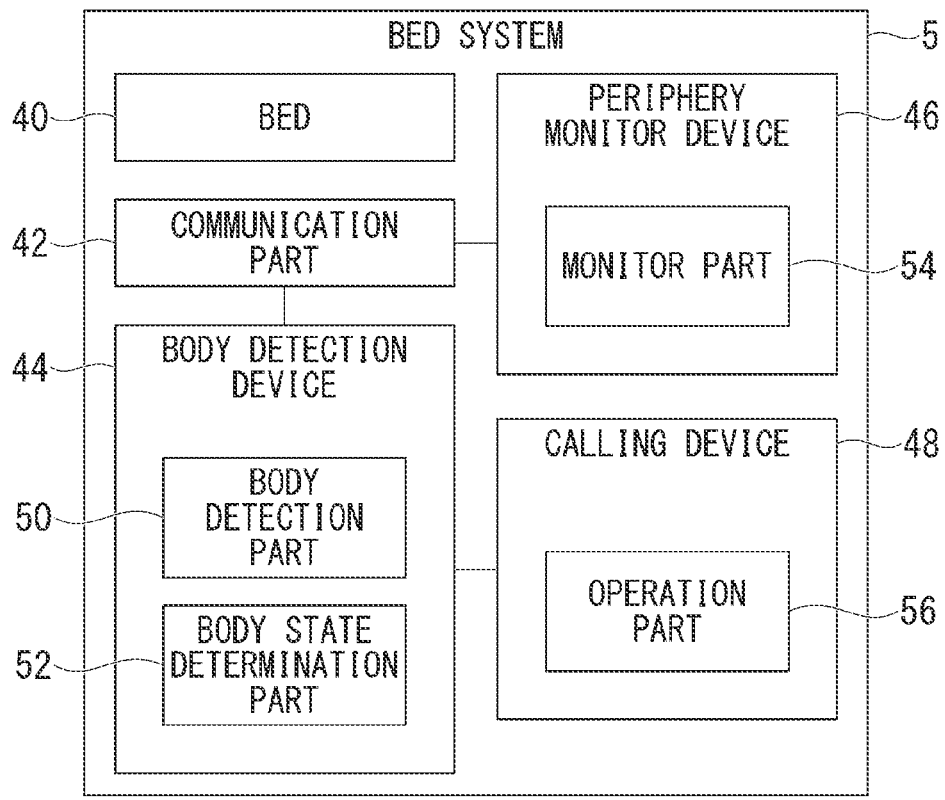
FIG. 3 is a view showing a configuration example of a bed system according to the first embodiment.

FIG. 3 is a view showing a configuration example of a bed system according to the first embodiment.

As shown in FIG. 3, the bed system 5 includes a bed 40, a communication part 42, a body detection device 44, a periphery monitor device 46, and a calling device 48.

The bed 40 is an example of a support device that supports a body of a patient in a lying posture (supine, lateral, or prone position). The bed 40 is fixed at a predetermined position such as a hospital room. The structure of the bed 40 will be discussed later.

The communication part 42 is, for example, a communication module for connecting to the network NW or communicating directly with another device and the like. The communication part 42 may be a device that performs wireless communication or may be a device that performs wired communication. The communication part 42 performs data communication with the server device 7 in response to the control of the body detection device 44, the periphery monitor device 46, or the like.

The body detection device 44 detects a state of a patient supported by the bed 40. The body detection device 44 includes a body detection part 50 and a body state determination part 52. The body detection part 50 detects a patient supported by the bed 40. The body detection part 50 includes, for example, a pressure sensor. The body state determination part 52 determines the state of the patient on the basis of the detection result of the body detection part 50. In a case where the body detection part 50 includes a pressure sensor, the body state determination part 52 determines the position and the posture of the patient, for example, on the basis of a pressure distribution on the bed 40 detected by the pressure sensor. The body detection part 50 may include a camera, and the body state determination part 52 may determine the state of the patient on the basis of an image or a video imaged by the camera. In a case where it is determined that the patient is in a waiting state (predetermined state), the body state determination part 52 generates a transmission signal and transmits the transmission signal to the server device 7 via the communication part. The waiting state is a state in which a patient is waiting for the arrival of the movable body 3. For example, the waiting state is a state in which the patient is sitting beside a deformation part 64 of the bed 40 described later.

The periphery monitor device 46 monitors the periphery of the bed 40. The periphery monitor device 46 includes a monitor part 54. The monitor part 54 recognizes an object around the bed 40. The monitor part 54 includes, for example, a camera. The camera is provided in the vicinity of the bed 40. The camera is, for example, a digital camera using a solid-state imaging device such as a CCD (Charge-Coupled Device) or a CMOS (Complementary Metal-Oxide-Semiconductor). For example, the camera periodically and repeatedly images a vicinity of the bed 40. The monitor part 54 transmits a transmission signal to the server device 7 via the communication part 42. The camera of the monitor part 54 may be common to the camera of the body detection part 50. The monitor part 54 may include, for example, a LIDAR.

The calling device 48 is provided in the vicinity of the bed 40. The calling device 48 includes a button-like operation part 56 that receives an operation of a patient or the like. For example, the calling device 48 is connected to a body detection device 44. In the calling device 48, an operation of the operation part 56 triggers the body detection device 44.

Figure 4:
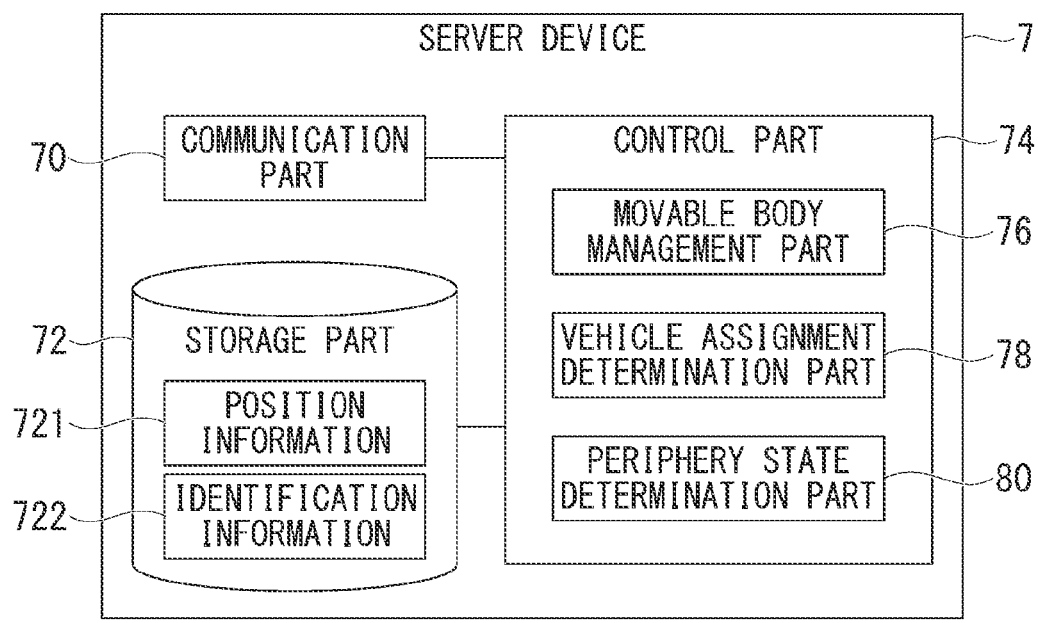
FIG. 4 is a view showing a configuration example of a server device according to the first embodiment.

FIG. 4 is a view showing a configuration example of a server device according to the first embodiment.

As shown in FIG. 4, the server device 7 includes a communication part 70, a storage part 72, and a control part 74.

The communication part 70 is, for example, a communication module for connecting to the network NW or communicating directly with another device or the like. The communication part 70 performs data communication with the movable body 3 and the bed system 5 in response to the control of the control part 74.

The storage part 72 is constituted using a storage device such as a magnetic hard disk device or a semiconductor storage device. The storage part 72 stores data used by the control part 74. The storage part 72 stores, for example, position information 721 and identification information 722. The position information 721 includes bed position information and movable body position information. The identification information 722 includes movable body identification information assigned to each movable body 3 and bed identification information assigned to each bed 40.

The control part 74 is constituted using a processor such as a CPU (Central Processing Unit) and a memory. The control part 74 functions as a movable body management part 76, a vehicle assignment determination part 78, and a periphery state determination part 80 by the processor executing a program. All or some of the functions of the control part 74 may be implemented using hardware such as an ASIC (Application-Specific Integrated Circuit), a PLD (Programmable Logic Device), and a FPGA (Field-Programmable Gate Array). The program may be stored in advance in a storage device (a storage device including a non-transitory storage medium) such as a HDD (Hard Disk Drive) or a flash memory, or may be stored in a removable storage medium (a non-transitory storage medium) such as a DVD or a CD-ROM and be installed in the storage device by the storage medium being mounted on a drive device.

The movable body management part 76 receives information from the movable body 3 and stores, in the storage part 72, the movable body identification information, the movable body position information, and the like that are received.

The vehicle assignment determination part 78 determines the movable body 3 to be dispatched to the bed 40 at which a calling operation has been performed.

The vehicle assignment determination part 78 may determine the movable body 3 to be dispatched, for example, on the basis of the movable body identification information and the movable body position information of each movable body 3 stored in the storage unit 72 and the bed position information of the bed 40 at which the calling operation has been performed.

The periphery state determination part 80 determines whether or not the movable body 3 can be dispatched to the bed 40 on the basis of an output of the periphery monitor device 46. For example, the periphery state determination part 80 determines whether or not an object that prevents the travel of the movable body 3 is present at a predetermined position beside which the movable body 3 is to be located around the bed 40 at which the calling operation has been performed and on a route of the movable body 3 to the predetermined position.

Figure 5:
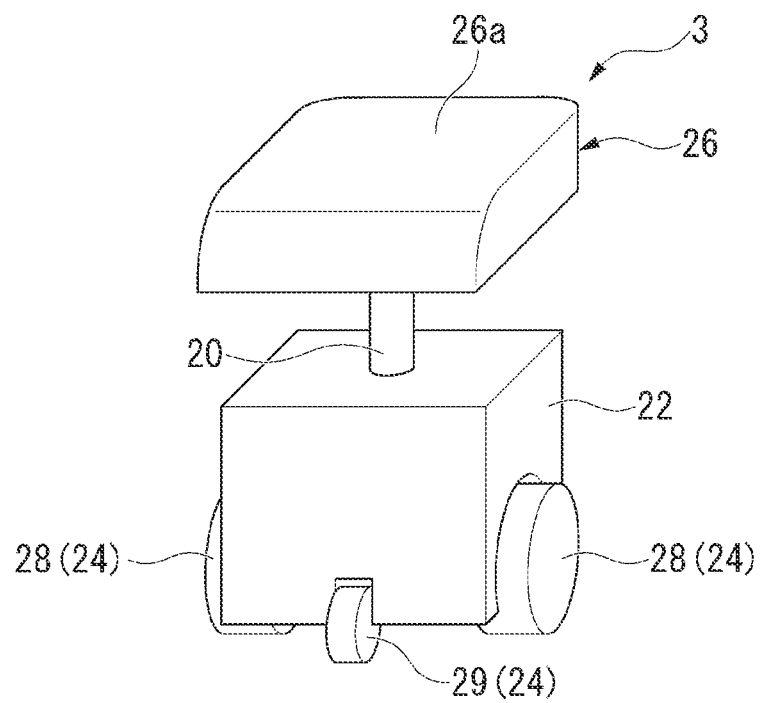
FIG. 5 is a perspective view showing a movable body according to the first embodiment.

FIG. 5 is a perspective view showing a movable body according to the first embodiment.

As shown in FIG. 5, the movable body 3 is, for example, a vehicle of an omni-directional movement type and includes a base body 22, a wheel 24 that is attached to the base body 22, a cushioning-like seat part 26 on which an occupant (patient) is seated, and a lifting mechanism 20 that drives the seat part 26. The ECU 10, the communication part 12, the position sensor 14, the motor 16, the battery 18 described above, and the like are accommodated inside the base body 22. However, the motor 16 may be an in-wheel motor.

The wheel 24 includes a main wheel 28 which is a drive wheel and an auxiliary wheel 29 which is a driven wheel. Right and left main wheels 28 are provided on right and left sides, respectively. The main wheel 28 is driven by the motor 16. The main wheel 28 is, for example, an omni-wheel type. The auxiliary wheels 29 are provided at front and rear positions of the main wheel 28 (the rear auxiliary wheel 29 is not shown). However, the configuration of the wheel 24 is not limited thereto, and it is sufficient that the movable body 3 be constituted as a omni-directional movement type. For example, only one main wheel 28 may be provided, or the auxiliary wheel 29 may be provided on only one of the front and rear sides. The auxiliary wheel 29 may be movable upward and downward relative to the base body 22. For example, when the movable body 3 is traveling, only the main wheel 28 may be located on the ground. For example, when the movable body 3 is stopped, both the main wheel 28 and the auxiliary wheel 29 may be located on the ground, and static stability is ensured. The front and rear directions of the movable body 3 are determined, for example, by the shape of the seat part 26. In this case, a direction in which an occupant faces when seated on the seat part 26 in a comfortable state is the front direction.

The seat part 26 is provided above the base body 22. An upper surface of the seat part 26 is a seat surface 26a that supports the hip of an occupant from below. The seat part 26 is supported by the base body 22 via the lifting mechanism 20. The lifting mechanism 20 is, for example, an actuator formed of a motor and a ball screw. However, the configuration of the lifting mechanism 20 is not limited thereto and may be, for example, a hydraulic mechanism or a rack and pinion mechanism. The lifting mechanism 20 is controlled by the ECU 10 and supports the seat part 26 such that the seat part 26 is capable of being raised and lowered relative to the base body 22.

Figure 6:
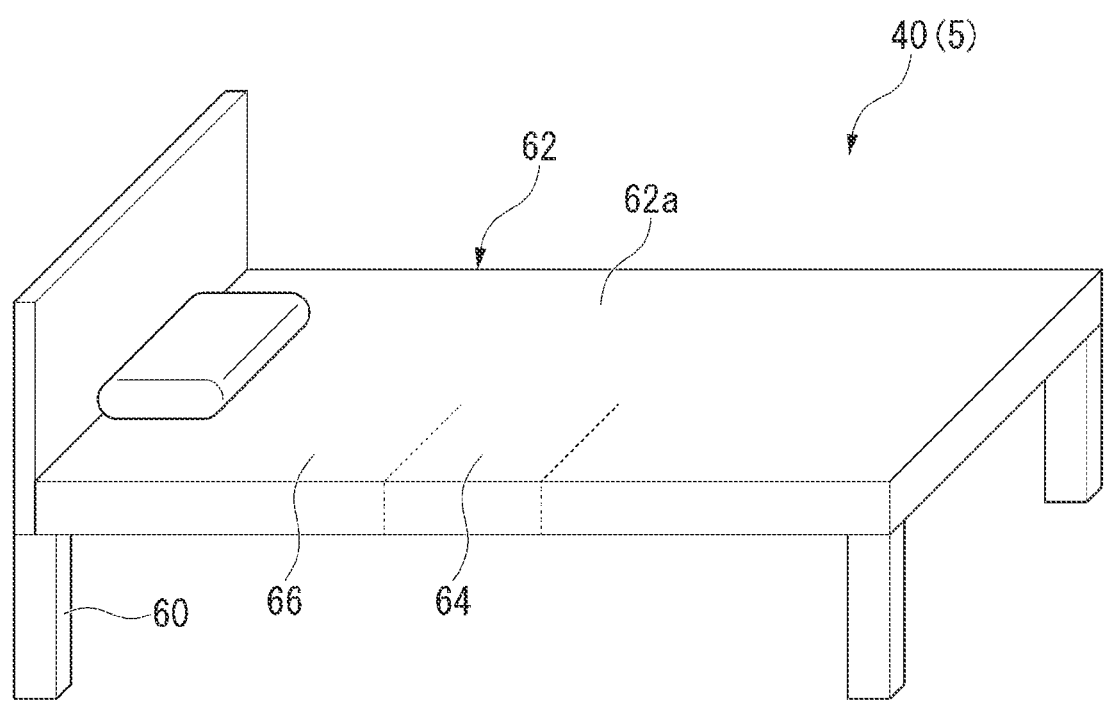
FIG. 6 is a perspective view showing a bed according to the first embodiment.

FIG. 6 is a perspective view showing a bed according to the first embodiment.

As shown in FIG. 6, the bed 40 includes a frame 60 that is provided on a floor surface and a mattress 62 that is supported by the frame 60. The bed 40 may have a back-lift function, a knee-lift function, or the like (not shown).

The mattress 62 is formed in a rectangular shape in plan view seen from above. An upper surface 62a (support surface) of the mattress 62 supports a patient. The upper surface 62a of the mattress 62 extends in a horizontal direction. The mattress 62 includes a deformation part 64 and a main part 66 that is a part other than the deformation part 64. The deformation part 64 includes a portion of an edge part in the entire mattress 62. The edge part is a part along an outline of the mattress 62 in plan view. The deformation part 64 is formed to be displaceable relative to the main part 66. The position of the deformation part 64 is not particularly limited. The deformation part 64 may be provided at a position away from a corner of the mattress 62 as shown in the drawing or may be provided at a corner of the mattress 62.

Figure 7:
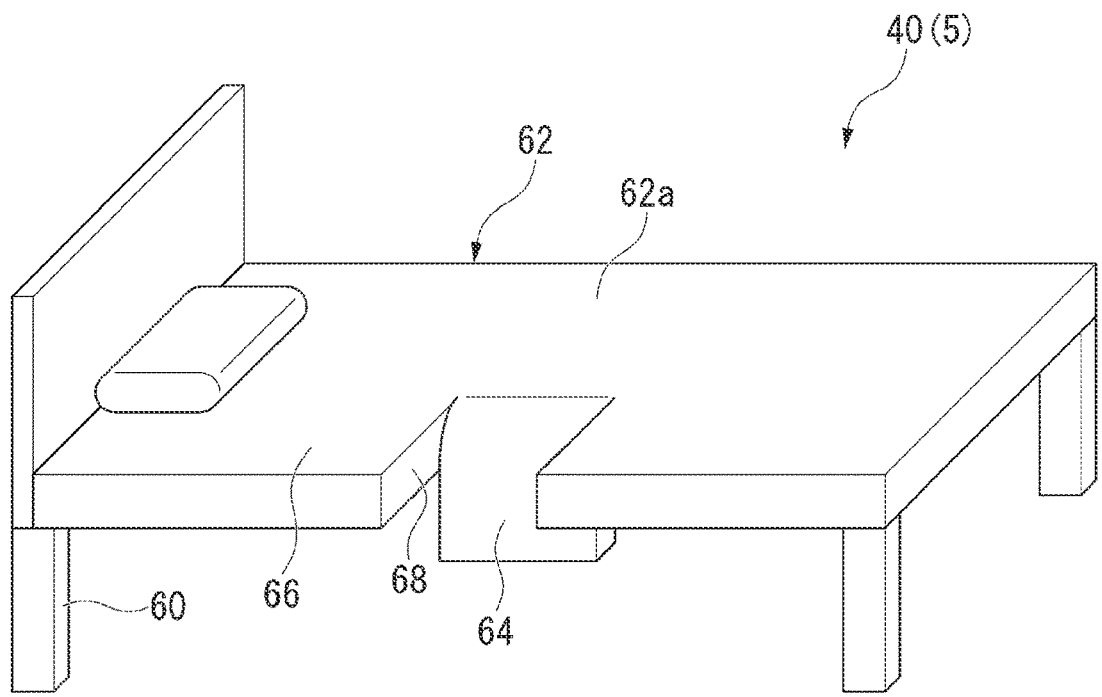
FIG. 7 is a perspective view showing a state in which a deformation part is displaced relative to a main part in the bed according to the first embodiment.

FIG. 7 is a perspective view showing a state in which the deformation part is displaced relative to the main part in the bed according to the first embodiment.

As shown in FIG. 7, the mattress 62 is deformed such that the deformation part 64 is deformed relative to the main part 66, and thereby, a portion of the edge part is hollowed in plan view. In the example shown in the drawing, the deformation part 64 is movable below the main part 66. Hereinafter, the position of the deformation part 64 when the upper surface of the deformation part 64 is located to be flush with the upper surface of the main part 66 as shown in FIG. 6 is referred to as a normal position, and the position of the deformation part 64 when the deformation part 64 moves below the main part 66 as shown in FIG. 7 is referred to as a retracted position. When the deformation part 64 is at the retracted position, a recess part 68 that opens at least in a horizontal direction and an upward direction is formed on the edge part of the mattress 62. The recess part 68 is formed in a shape that is capable of receiving the seat part 26 (refer to FIG. 5) of the movable body 3 in plan view. In the present embodiment, the recess part 68 is formed such that the entire seat part 26 is inserted in plan view.

The bed 40 is formed such that the deformation part 64 is capable of being moved from the normal position to the retracted position when the movable body 3 approaches. The bed 40 may include a drive mechanism that displaces the deformation part 64 relative to the main part 66 and may move the deformation part 64 to the retracted position in accordance with the approach of the movable body 3. For example, the bed 40 may control the drive mechanism on the basis of a notification signal that reports the approach of the movable body 3 and that is transmitted from the server device 7 or the movable body 3. The bed 40 may be formed such that the deformation part 64 is displaced relative to the main part 66 by the movable body 3. For example, the bed 40 may be formed to press the deformation part 64 toward the retracted position in the process of the movable body 3 entering the recess part 68. In this case, for example, the deformation part 64 may be biased in a direction toward the normal position from the retracted position, the deformation part 64 may be locked such that the deformation part 64 is held at the normal position by a lock mechanism, and the lock mechanism may be unlocked by contact of the movable body 3 with the lock mechanism.

Next, a process example of the movable body control system is described with reference to FIG. 8.

Figure 8:
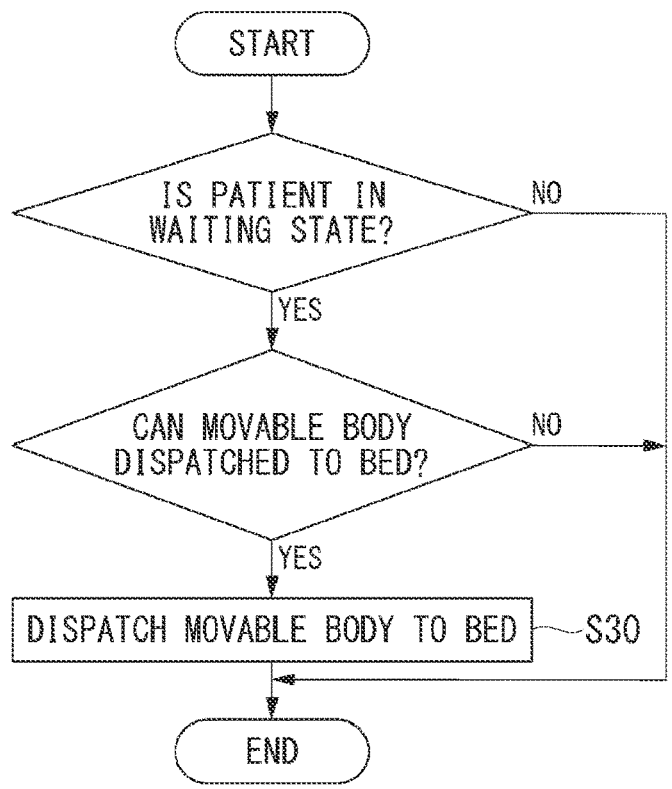
FIG. 8 is a flowchart showing a process example of the movable body control system according to the first embodiment.

FIG. 8 is a flowchart showing a process example of the movable body control system according to the first embodiment.

The movable body control system 1 performs the following process when the calling device 48 is operated. In Step S10, the body detection device 44 determines whether or not a patient is in a waiting state.

When it is determined that the patient is in a waiting state, the body detection device 44 transmits a transmission signal to the server device 7, and the server device 7 performs the process of Step S20. When it is determined that the patient is not in a waiting state, the movable body control system 1 ends a series of processes.

In Step S20, the server device 7 determines whether or not the movable body 3 can be dispatched to the bed 40 at which a calling operation has been performed by the periphery state determination part 80. When it is determined that the movable body 3 can be dispatched to the bed 40, the server device 7 performs the process of Step S30. When it is determined that movable body 3 cannot be dispatched to the bed 40, the movable body control system 1 ends a series of processes.

In Step S30, the server device 7 transmits command information to the movable body 3 that is determined by the vehicle assignment determination part 78 among a plurality of movable bodies 3. The command information includes position information of the bed 40 at which a calling operation has been performed.

Next, an operation of the movable body 3 that has received the command information is described with reference to FIG. 9.

Figure 9:
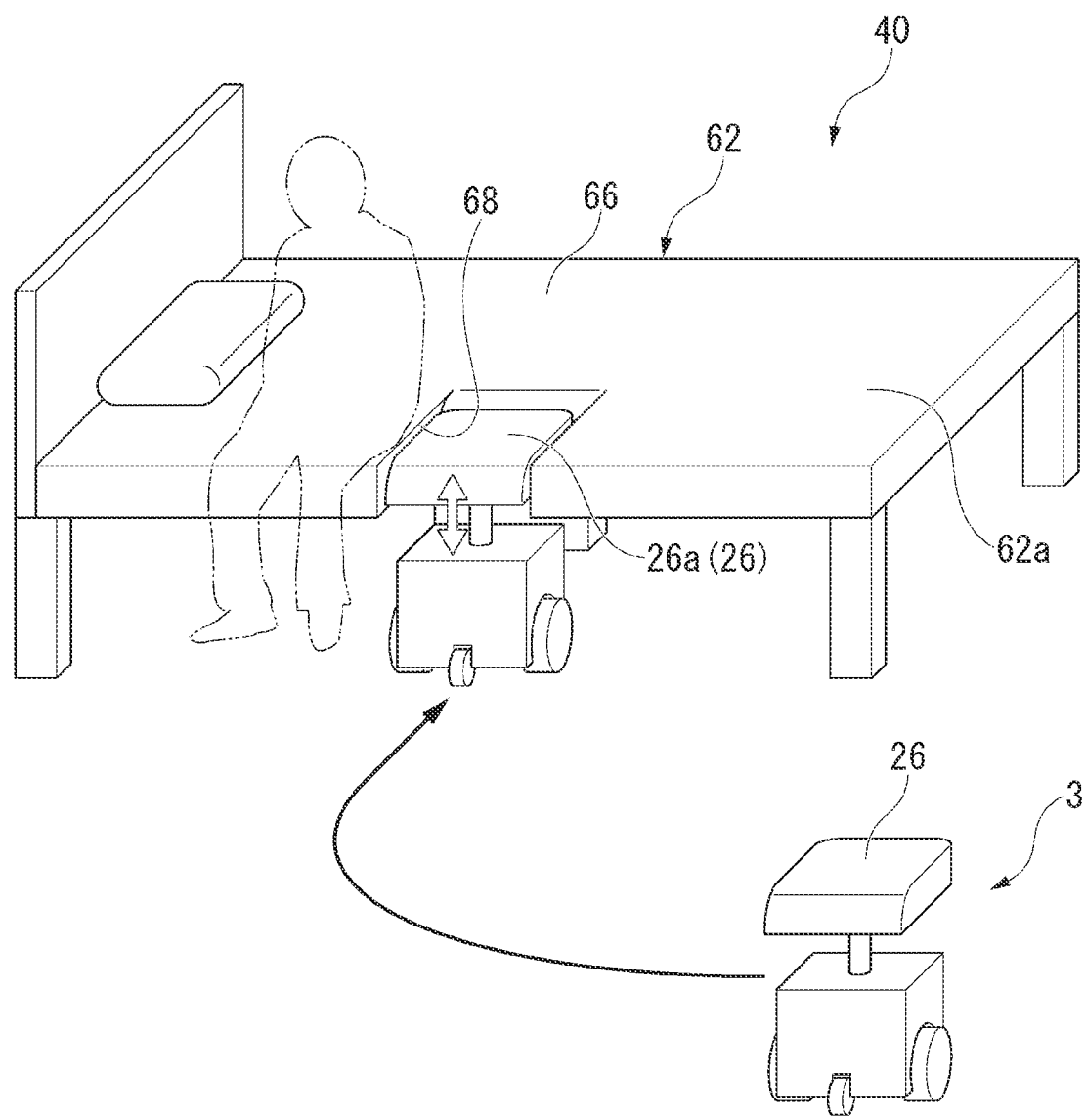
FIG. 9 is a view showing an operation of the movable body and the bed in the movable body control system according to the first embodiment.

FIG. 9 is a view showing an operation of the movable body and the bed in the movable body control system according to the first embodiment.

The ECU 10 of the movable body 3 generates a travel plan on the basis of position information of the bed 40 at which the calling operation has been performed and a measurement result of the position sensor 14. The ECU 10 controls the motor 16 or the like of the movable body 3 such that the bed 40 at which the calling operation has been performed is a destination and causes the movable body 3 to travel toward the bed 40.

The movable body 3 that arrives near the bed 40 approaches the bed 40 such that the seat part 26 enters the recess part 68 of the mattress 62. Hereinafter, the position of the movable body 3 in a state where the seat part 26 enters the recess part 68 of the mattress 62 is referred to as a boarding position. The movable body 3 moves backward toward the boarding position. The movable body 3 raises and lowers the seat part 26 as needed before or after arriving at the boarding position. Specifically, the ECU 10 controls the lifting mechanism 20 such that the height of the seat surface 26*a* of the seat part 26 is aligned with the height of the upper surface of the main part 66 of the mattress 62.

The movable body 3 that arrives at the boarding position stops and waits for the seating of the patient. When the patient is seated onto the seat part 26, the movable body 3 proceeds frontward away from the bed 40 and begins to move to a destination based on a command of the patient, a command from the server device 7, and the like. At this time, the movable body 3 may control the lifting mechanism 20 such that the seat part 26 is positioned at a height suitable for the seating of the patient.

As described above, according to the movable body control system 1 of the present embodiment, since the movable body 3 approaches the bed 40 when the patient is in a waiting state on the bed 40 and the movable body 3 is capable of approaching the bed 40, it is possible to move the movable body 3 close to the bed 40 without requiring the assistance of another person. Further, since a determination as to whether or not there is space in the vicinity of the bed 40 by the patient becomes unnecessary, it is possible to reduce the burden of the patient. Accordingly, it is possible to provide a movable body control system 1 that supports the patient on the bed 40 to ride the movable body 3.

Since the height of the seating surface 26*a* of the seat part 26 is aligned with the height of the upper surface 62*a* of the mattress 62 by the lifting mechanism 20 in a state where the movable body 3 is close to the bed 40, it becomes possible for the patient seated on the mattress 62 to easily transfer to the seat part 26 of the movable body 3.

The bed 40 is deformed such that a portion of the edge part of the mattress 62 is recessed such that the seat part 26 of the movable body 3 is capable of being received in plan view. Thereby, since the recess part 68 which the seat part 26 enters is formed at the edge part of the mattress 62, the patient can be seated on the seat part 26 of the movable body 3 by moving along the edge part of the mattress 62. Therefore, the patient can move in a state where the upper surface 62*a* of the mattress 62 is present behind the patient. Accordingly, it is possible to easily ride the movable body 3 in a stable posture compared to a case where the patient moves in a direction away from the bed and transfers to a movable body that is located beside the bed.

When the operation part 56 of the calling device 48 is operated, the movable body 3 approaches the bed 40. Thereby, it is possible to cause the movable body 3 to approach the bed 40 after confirming the patient's desire to use the movable body 3. Therefore, it is possible to realize efficient assignment of the movable body 3.

In the present embodiment, the seat part 26 is formed to be capable of being raised or lowered; however, the embodiment is not limited thereto. For example, the movable body 3 may not have the lifting mechanism 20 as long as the height of the seat surface 26*a* of the seat part 26 is approximately matched with the height of the upper surface 62*a* of the mattress 62. However, the movable body 3 may desirably have the lifting mechanism 20 so that it is possible to optimize the height of the seat part 26 at the time of traveling.

Further, a connection relationship between the main part 66 and the deformation part 64 of the mattress 62 is not limited to the example shown in the drawings. That is, the deformation part may not be provided rotatably relative to the main part. For example, the deformation part may be connected to the main part via a link mechanism. The deformation part may be formed to be movable above the main part. A portion of the edge part of the mattress 62 may be deformed to be recessed by part of the mattress moving in a horizontal direction.

Further, in the present embodiment, the deformation part 64 is formed to be movable from the normal position to the retracted position when the movable body 3 approaches; however, the deformation part may be formed to move based on the operation of the patient. Further, in the present embodiment, the deformation part 64 is formed to be displaced by the drive mechanism; however, the deformation part 64 may be formed to be displaced by an operation of a patient.

Further, in the present embodiment, the mattress 62 has the deformation part 64, and the seat part 26 of the movable body 3 is formed to enter the recess part 68 at the edge part of the mattress 62. However, the mattress may not have a deformation part, and the movable body 3 may be formed to be located beside the mattress without a gap.

Second Embodiment

Next, a second embodiment is described with reference to FIG. 10. In the first embodiment, the movable body 3 includes the seat part 26. On the other hand, the second embodiment differs from the first embodiment in that a portion of a mattress 62A of a bed 40A (support device) is used as a seat of a movable body 3A. The configuration other than that described below is similar to that of the first embodiment.

Figure 10:
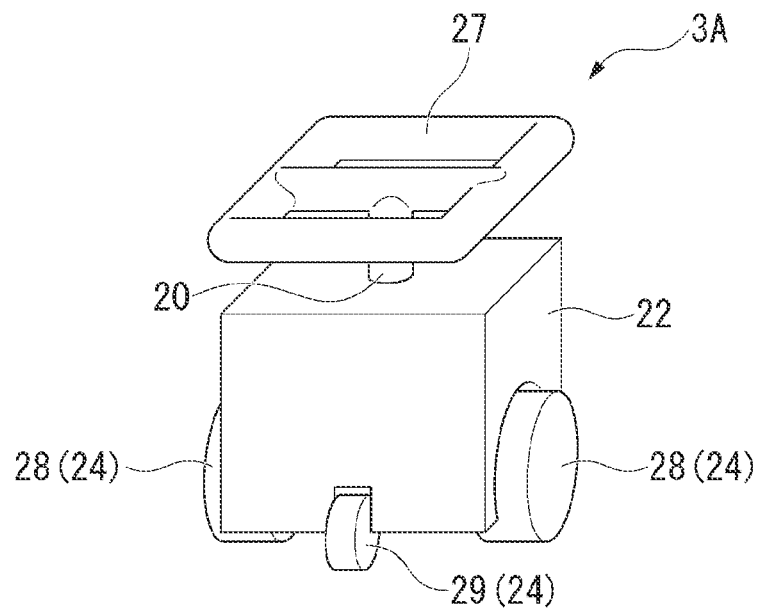
FIG. 10 is a perspective view showing a movable body according to a second embodiment.

FIG. 10 is a perspective view showing a movable body according to the second embodiment.

As shown in FIG. 10, the movable body 3A has a support part 27 that supports a removable part 65 of the mattress 62A described later in place of the seat part 26 of the first embodiment. The support part 27 is formed to be capable of supporting the removable part 65 from below in a state where a relative movement in the horizontal direction of the removable part 65 is regulated. The support part 27 is supported to be capable of being raised and lowered by the base body 22 via the lifting mechanism 20. The shape of the support part 27 is not limited to the example shown in the drawings.

Figure 11:
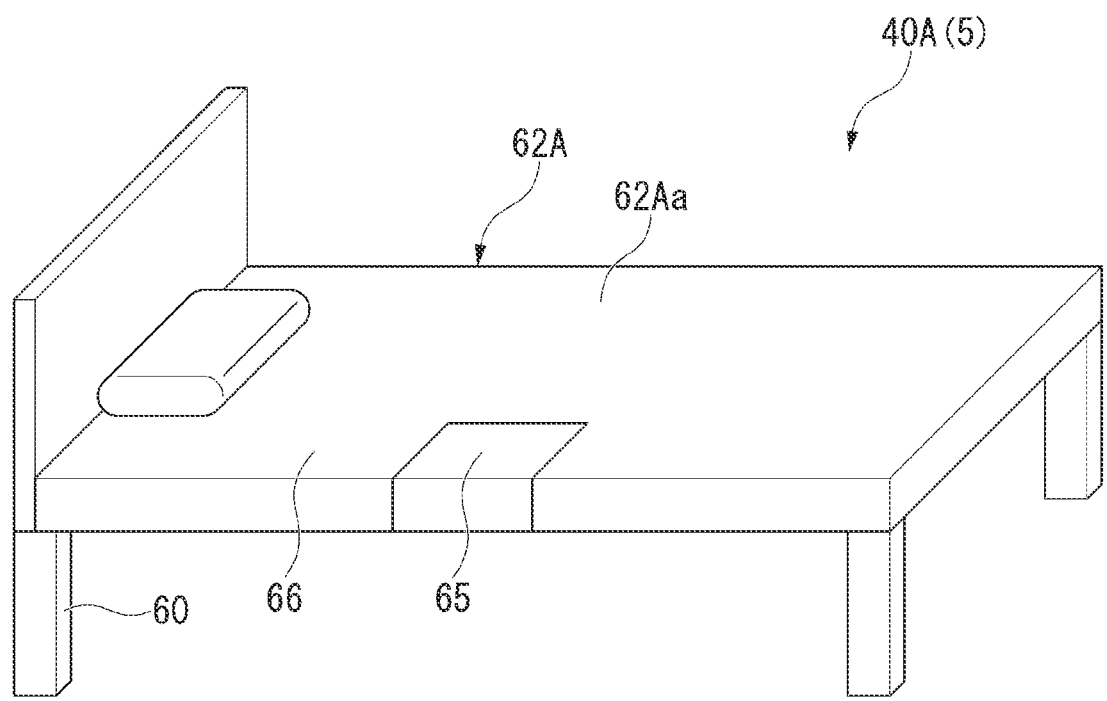
FIG. 11 is a perspective view showing a bed according to the second embodiment.

FIG. 11 is a perspective view showing the bed according to the second embodiment.

As shown in FIG. 11, the mattress 62A of the bed 40A has the removable part 65 in place of the deformation part 64 of the first embodiment. The removable part 65 includes an upper surface 62Aa (support surface) of the mattress 62A and includes a portion of an edge part in the entire mattress 62A. The removable part 65 is attachable to and detachable from the main part 66. For example, the removable part 65 is removed from the main part 66 by regulating the movement in the horizontal direction relative to the main part 66 and being lifted relative to the main part 66. The support part 27 of the movable body 3A is capable of entering below the removable part 65. The position of the removable part 65 is not particularly limited. The removable part 65 may be provided at a position away from a corner of the mattress 62A as shown in the drawing or may be provided at a corner of the mattress 62A.

Next, an operation of the movable body 3A that receives the command information is described with reference to FIG. 12 and FIG. 13.

Figure 12:
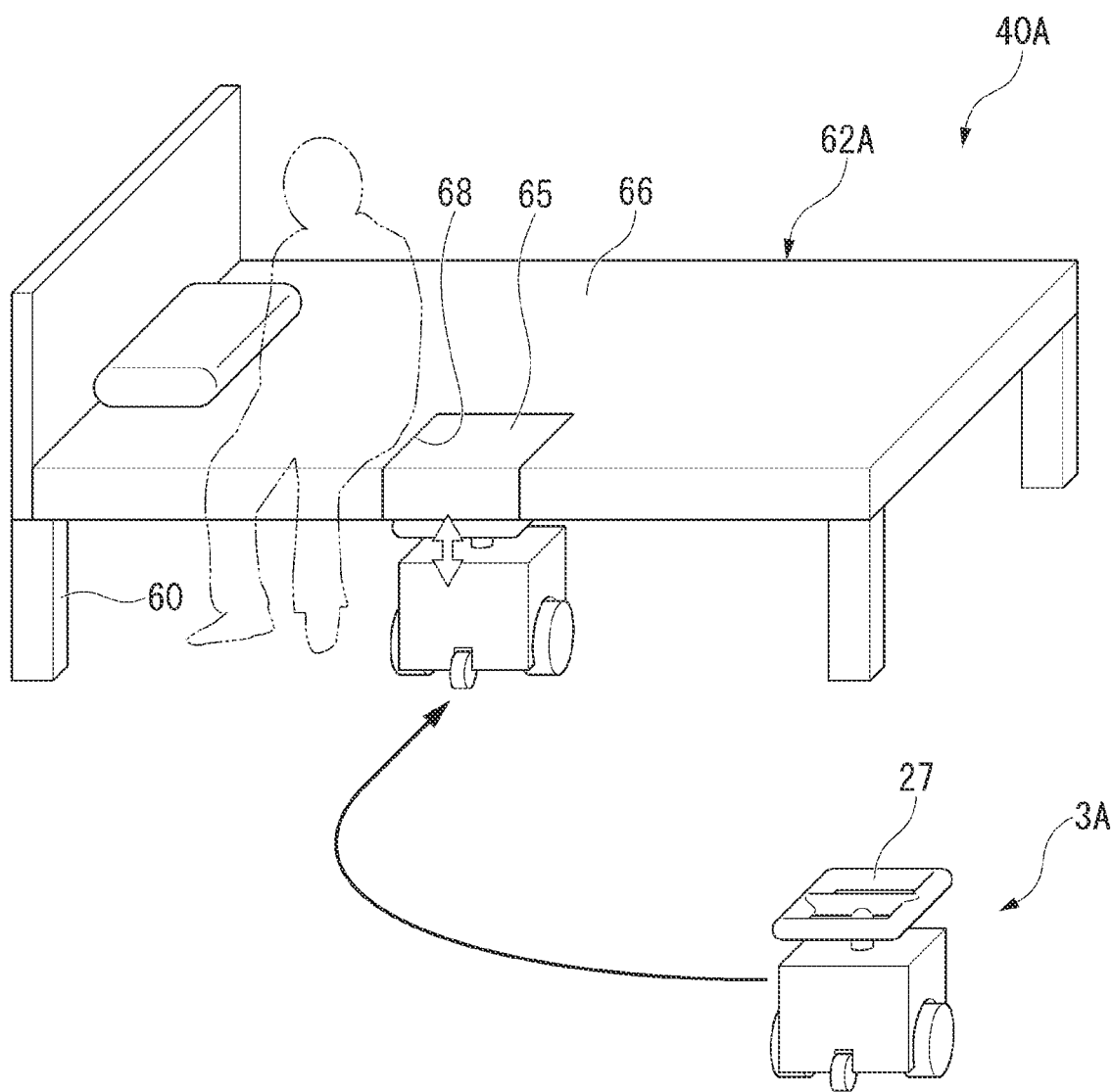
FIG. 12 is a view showing an operation of the movable body and the bed in the movable body control system according to the second embodiment.
Figure 13:
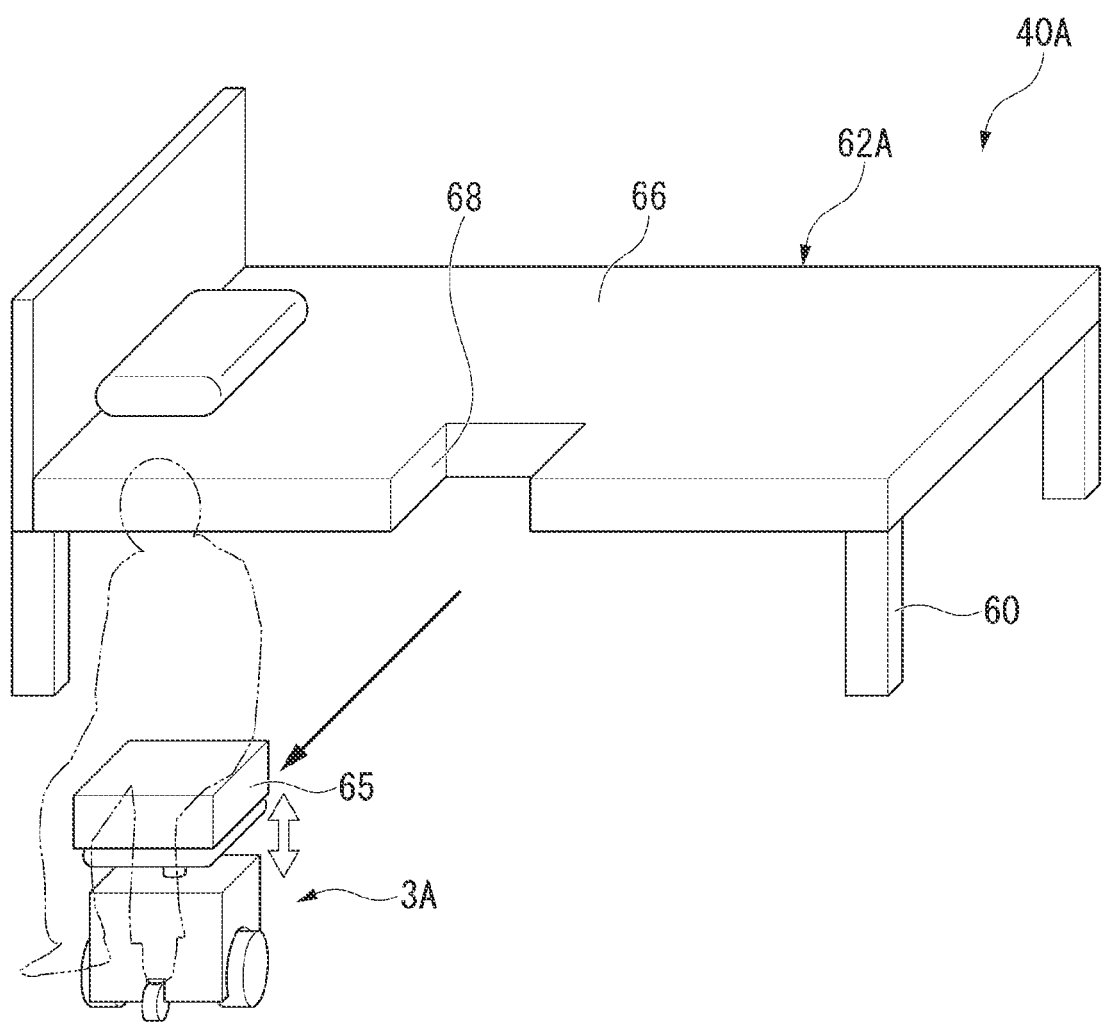
FIG. 13 is a view showing the operation of the movable body and the bed in the movable body control system according to the second embodiment.

FIG. 12 and FIG. 13 are views showing an operation of the movable body and the bed in the movable body control system according to the second embodiment.

As shown in FIG. 12, the movable body 3A that arrives near the bed 40A approaches the bed 40A such that the support part 27 enters below the removable part 65 of the mattress 62A. The movable body 3A joins the support part 27 to the removable part 65 and thereby utilizes the removable part 65 as a seat that supports the hip of the patient from below. As shown in FIG. 13, when the patient is seated on the removable part 65, the movable body 3A begins to move to a destination based on a command of the patient, a command from the server device 7, and the like. At this time, the movable body 3 may control the lifting mechanism 20 such that the removable part 65 is positioned at a height suitable for the seating of the patient.

According to a movable body control system 1A described above, in addition to the same advantages as those of the first embodiment, the following advantages are achieved.

The bed 40A includes the removable part 65 which includes the upper surface 62Aa of the mattress 62A that supports the patient and which is formed to be removable. The removable part 65 is supported by the movable body 3A. Thereby, it is possible to use part of the bed 40A as a seat of the movable body 3A on which the patient is seated.

In the present embodiment, the entire removable part 65 of the mattress 62A is the seat of the movable body 3A which supports the hip of the patient; however, for example, a portion of the removable part may be formed to be capable of being flexed and become a cushion which supports the hip of the patient and a backrest which supports the waist of the patient from a rear direction.

Further, a direction in which the movable body 3A approaches the removable part 65 of the mattress 62A is not particularly limited; for example, the movable body 3A may pass below the main part 66 of the mattress 62A and cause the support part 27 to enter below the removable part 65. In this case, since the movable body 3A can approach the bed 40A without interfering with the patient seated on the removable part 65 in advance, the patient seated on the removable part 65 can ride the movable body 3A as is.

The present invention is not limited to the embodiments described with reference to the drawings, and various modified examples can be conceivable within the technical scope thereof.

For example, the above embodiments are described using an example in which a bed is a support device that supports the body of a patient in a lying posture; however, the support device may be a stretcher, an examination table, or the like. When the support device is movably provided, a system that measures the position of the support device can be preferably provided.

Further, the above embodiments are described using an example of a movable body control system installed in a medical facility such as a hospital; however, the movable body control system may be installed in a care facility such as a nursing home.

Further, the configuration of the movable body is not limited to the embodiments described above. For example, the movable body may include an armrest, a backrest, or the like. However, the movable body can be preferably formed such that there is no structure that projects upward around the seat part or the removable part of the mattress when the patient is transferred to the movable body.

Further, in the embodiments described above, the mattress of the bed is formed to be deformed or removed; however, the mattress and the frame may be formed to be integrally deformed or removed.

Further, in the embodiments described above, the body detection device 44 determines whether or not a patient is in a waiting state using the operation of the calling device 48 as a trigger; however, the calling device 48 may not be provided. In this case, in a case where the body detection device 44 determines the state of the patient always or periodically and it is detected that the patient is in a waiting state, the periphery state determination part 80 may determine whether or not the movable body 3 can be dispatched.

Further, in the embodiments described above, the bed system 5 requires assignment of the movable bodies 3, 3A via the server device 7; however, the embodiment is not limited thereto. For example, the periphery state determination part may be provided in the bed system, and the bed system may communicate with the movable body without the server device and require the movable body to approach the bed. In this case, the bed system may cause a movable body at a position closest to the bed to approach or may cause a predetermined movable body that is associated with the bed in advance to approach.

Further, in the embodiments described above, the movable body 3 is a vehicle of an omni-directional movement type; however, the embodiment is not limited thereto. For example, the movable body may not be movable in a lateral direction and may be a vehicle capable of only advancing, retracting, and rotating.

The components in the embodiments described above can be replaced by known components without departing from the scope of the present invention, and the embodiments described above may be suitably combined.

What is claimed is:

1. A movable body control system, comprising:
a plurality of movable bodies on which a user is capable of riding;
a support system; and
a server device,
wherein the plurality of movable bodies are remotely controlled by the server device,
the support system comprises:
a support device that supports a body of the user in a lying posture;
a body detection device that detects a state of the user supported by the support device; and a periphery monitor device that monitors a periphery of the support device, the server device comprises a determination part that determines whether or not the movable body is capable of approaching the support device based on a detection result of the periphery monitor device, and in a case where the body detection device detects that the user is in a waiting state and the determination part determines that the movable body is capable of approaching the support device, the movable body approaches the support device.

2. The movable body control system according to claim 1, wherein each of the plurality of movable bodies comprises:
a seat part on which the user is seated;
a lifting mechanism that raises and lowers the seat part; and
a movable body control part that controls the lifting mechanism, wherein
the movable body control part controls the lifting mechanism such that a height of a seating surface of the seat part is aligned with a height of a support surface that supports the user in the support device in a state where the movable body approaches the support device and stops.

3. The movable body control system according to claim 2, wherein the support device is deformed such that a portion of an edge part is recessed to be capable of receiving the seat part in plan view.

4. The movable body control system according to claim 3, wherein the support system further comprises an operation part that receives an operation of the user, and
one of the plurality of movable bodies approaches the support device in a case where the operation part is operated.

5. The movable body control system according to claim 2, wherein the support system further comprises an operation part that receives an operation of the user, and
one of the plurality of movable bodies approaches the support device in a case where the operation part is operated.

6. The movable body control system according to claim 5, wherein the waiting state is a state in which the user is waiting for an arrival of one of the plurality of movable bodies.

7. The movable body control system according to claim 6, wherein when the operation part is operated, the body detection device determines whether or not the user is in the waiting state,
when it is determined that the user is in the waiting state, the server device determines whether or not one of the plurality of movable bodies is able to be dispatched to the support device, and
when it is determined that one the plurality of movable bodies is able to be dispatched to the support device, the server device transmits command information to the one of the plurality of movable bodies, and the movable body control part of the one of the plurality of movable bodies that receives the command information causes the one of the plurality of movable bodies to travel toward the support device based on the command information.

8. The movable body control system according to claim 1, wherein the support device includes a removable part which includes a support surface that supports the user and which is formed to be removable, and
the removable part is supported by one of the plurality of movable bodies.

9. The movable body control system according to claim 8, wherein the support system further comprises an operation part that receives an operation of the user, and
the one of the plurality of movable bodies approaches the support device in a case where the operation part is operated.

10. The movable body control system according to claim 1,
wherein the support system further comprises an operation part that receives an operation of the user, and
one of the plurality of movable bodies approaches the support device in a case where the operation part is operated.

11. The movable body control system according to claim 1,
wherein the waiting state is a state in which the user is waiting for an arrival of one of the plurality of movable bodies.

* * * * *